US012716115B2

(12) United States Patent
Heinze

(10) Patent No.: US 12,716,115 B2
(45) Date of Patent: Aug. 25, 2026

(54) ALLOY, POWDER, METHOD AND COMPONENT

(71) Applicant: Siemens Energy Global GmbH & Co. KG, Munich (DE)

(72) Inventor: Christoph Heinze, Markkleeberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 408 days.

(21) Appl. No.: 18/275,000

(22) PCT Filed: Jan. 31, 2022

(86) PCT No.: PCT/EP2022/052190

§ 371 (c)(1),
(2) Date: Jul. 29, 2023

(87) PCT Pub. No.: WO2022/171473

PCT Pub. Date: Aug. 18, 2022

(65) Prior Publication Data

US 2024/0084423 A1 Mar. 14, 2024

(30) Foreign Application Priority Data

Feb. 9, 2021 (DE) .................... 10 2021 201 196.9

(51) Int. Cl.
*C22C 19/05* (2006.01)
*B22F 10/28* (2021.01)
*B33Y 10/00* (2015.01)
*B33Y 70/00* (2020.01)

(52) U.S. Cl.
CPC ............ *C22C 19/055* (2013.01); *B22F 10/28* (2021.01); *B33Y 10/00* (2014.12); *B33Y 70/00* (2014.12); *C22C 19/056* (2013.01); *B22F 2301/15* (2013.01); *B22F 2998/10* (2013.01); *B22F 2999/00* (2013.01)

(58) Field of Classification Search
CPC ... C22C 19/055; C22C 1/0433; C22C 19/056; C22C 30/00; B22F 10/28; B22F 2301/15; B22F 2998/10; B22F 2999/00; B22F 5/009; B22F 5/04; B33Y 10/00; B33Y 70/00; B33Y 80/00; Y02P 10/25; B23K 35/0244; B23K 35/304
See application file for complete search history.

(56) References Cited

U.S. PATENT DOCUMENTS 3,746,581 A 7/1973 Cairns
3,890,816 A 6/1975 Allen
4,039,330 A * 8/1977 Shaw .................... C22C 19/055 420/443
4,288,247 A * 9/1981 Shaw .................... C22C 19/055 420/443
4,519,979 A 5/1985 Shaw
11,753,701 B2 * 9/2023 Heinze .................. C22C 19/055 420/448
2019/0055627 A1 * 2/2019 Nagatomi ............ C22C 19/055
2022/0064762 A1 3/2022 Heinze
2022/0243306 A1 * 8/2022 Gehrmann ................ B22F 1/05
2022/0251685 A1 * 8/2022 Burbaum ........... B23K 35/0244

FOREIGN PATENT DOCUMENTS

CN 111448327 A 7/2020
DE 2303802 B2 11/1977
DE 2445462 C3 12/1979
DE 3427206 C2 7/1996
DE 102020116868 A1 1/2021
WO 2020135995 A1 7/2020

OTHER PUBLICATIONS

PCT International Search Report and Written Opinion of International Searching Authority mailed May 19, 2022 corresponding to PCT International Application No. PCT/EP2022/052190 filed Jan. 31, 2022.
Metals and their Weldability, Welding Handbook, American Welding Society, Jan. 31, 1991, p. 316, vol. 4, China Machine Press, Beijing: China [English translation attached].

* cited by examiner

*Primary Examiner* — John A Hevey
(74) *Attorney, Agent, or Firm* — Wolter Van Dyke Davis, PLLC

(57) ABSTRACT

A nickel-based alloy, having (in wt. %): carbon(C): 0.09%-0.13%; chromium(Cr): 19.0%-21.5%; cobalt(Co): 18.0%-20.0%; molybdenum(Mo): 0.5%-1.5%; tungsten(W): 2.0%-3.0%; titanium(Ti): 2.0%-3.0%; aluminum(Al): 2.2%-3.0%; boron(B): 0.008%-0.012%; zirconium(Zr): 0.0025%-0.01%; tantalum(Ta): 2.0%-4.0%; niobium(Nb): 1.2%-2.0%; optionally silicon(Si): up to 0.02%; manganese(Mn): up to 0.01%; yttrium(Y): 0.0025%-0.01%; yttrium oxide ($Y_2O_3$): 0.75%-1.25%; vanadium(V): up to 0.01%; hafnium (Hf): up to 0.01%, silver(Ag): up to 0.005%; lead(Pb): up to 0.0003%; iron(Fe): up to 0.02%; copper(Cu): up to 0.01%; selenium(Se): up to 0.0003%; oxygen(O): up to 0.015%; phosphorus(P): up to 0.005%; sulfur(S): up to 0.001%; gallium(Ga): up to 0.001%; bismuth(Bi): up to 0.0001%; nitrogen(N): up to 0.008%; magnesium(Mg): up to 0.007%; tellurium(Te): up to 0.00005%; thallium(Tl): up to 0.0005%; calcium(Ca): up to 0.0001%; potassium(K): up to 0.0001%, residual impurities: up to 0.1%.

14 Claims, No Drawings

ALLOY, POWDER, METHOD AND COMPONENT

CROSS REFERENCE TO RELATED APPLICATIONS

This application is the US National Stage of International Application No. PCT/EP2022/052190 filed 31 Jan. 2022, and claims the benefit thereof, which is incorporated by reference herein in its entirety. The International Application claims the benefit of German Application No. DE 10 2021 201 196.9 filed 9 Feb. 2021.

FIELD OF INVENTION

The present invention refers to an improvement in the chemical composition of nickel-based superalloys.

BACKGROUND OF INVENTION

Additive manufacturing, such as selective laser beam fusion (L-PBF), for example, though not restricted to the process stated, is based on the selective, layer-by-layer melting of starting material in the form of powder layers for the purpose of generating a geometric object. In the L-PBF of alloys with high-temperature resistance, the process is accompanied by microcracks and the heat treatment by macrocracks. The material IN939 is currently a material which can be built up productively and crackles sly in a layer thickness of 40 μm, but for certain applications does not afford sufficient mechanical properties, such as creep resistance and oxidation resistance, for example. The exploration and industrialization of further hot-gas components produced by additive manufacture, however, requires an alloy with a suitable combination of mechanical properties, oxidation resistance at high metal temperatures, and productivity.

The problem has to date been alleviated through the possibilities of design and/or of cooling-air provision; an increased demand for cooling air for the component reduces the efficiency of the gas turbine.

SUMMARY OF INVENTION

It is an object of the invention to solve the problem stated above. The object is achieved by an alloy as claimed, a powder as claimed, a process as claimed, and a component as claimed.

The invention utilizes an improvement in the chemical composition of nickel-based superalloys in the sense of an improvement in the creep resistance and oxidation resistance through adaptation of suitable elements, while retaining the capacity for crack-free processing and the productivity.

The invention is described only illustratively below. A description will now be given of the function of the individual elements included in the high-temperature-resistant nickel-based alloy for the purpose of performing the above-described invention.

Carbon (C) is added and, in addition to its function as a deoxidizing element, has further functions of combining with titanium (Ti), niobium (Nb) and tantalum (Ta) to form stable MC-type primary carbides in order to suppress the coarsening of austenitic grains during a hot forming operation and to improve the high-temperature lubricity. The desired effect of the carbon (C) is achieved by adding an amount of at least 0.9%, but if added at more than 0.13% it forms the catenary microstructure of the MC-type carbide and causes hot cracks to form, originating from this part, with a consequent reduction in tooling life.

Carbon (C) is added accordingly in an amount of 0.09 wt % to 0.13 wt %, preferably 0.09 wt % to 0.11 wt %.

Silicon (Si) may be added preferably as a deoxidizing agent and at the same time acts to improve the adhesion of a developing oxide layer. If added excessively, however, it causes a reduction both in the hot formability and in the ductility at ambient temperatures. Silicon (Si) may therefore be added in an amount of up to 0.02 wt % or less.

Manganese (Mn) may be added as a deoxidizing agent. If added excessively, it causes a reduction in the high-temperature strength, and therefore manganese (Mn) is added in an amount of 0.01 wt % or less.

Chromium (Cr) forms an oxide layer with extremely close adhesion on the surface during heating to high temperatures, and improves the oxidation resistance. Additionally, chromium (Cr) may also improve the hot formability.

To achieve this activity, it must be added in an amount of more than 19.0 wt %, but if added excessively, at more than 21.5 wt %, it causes the precipitation of an a phase, which is accompanied by a reduction in the ductility.

Accordingly, the amount of chromium (Cr) is in a range above 19.0 wt % but not more than 21.5 wt %, preferably between 19.0 wt % and 21.0 wt %.

Tungsten (W) is an additive element which substantially strengthens the austenitic solid solution up to high temperatures.

In order to achieve these effects, tungsten (W) must be added in an amount of at least 2.0 wt %, but if added excessively, at more than 3.0 wt %, it causes the excessive precipitation of α-W and a reduction both in the oxidation resistance and in the close adhesion of an oxide film. With particular preference, accordingly, the amount of tungsten (W) is in the range from 2.5 wt % to 3.0 wt %.

Molybdenum (Mo) is an element in the same group as tungsten (W), and replacing some of the tungsten (W) with molybdenum (Mo) may therefore provide the same function as that of tungsten (W). Since, however, its effect is lower than that of tungsten (W), molybdenum (Mo) is added in a range of 0.5 wt % to 1.5 wt %, more particularly 0.8 wt % to 1.5 wt %.

Iron (Fe) need not necessarily be added to the present alloy. Since, however, iron (Fe) present in a solid solution state in an austenitic phase primarily comprising nickel (Ni) is able to improve the hot formability and since it can be used in order to save on raw materials and to reduce the prices, iron (Fe) is used as and when required. If added excessively, however, it softens an austenitic phase and reduces the precipitated amount of a γ' phase, so leading to a reduction in the high-temperature strength. Iron (Fe) is added, accordingly, in an amount of up to 0.02 wt %.

Aluminum (Al) is an additive element which is key to the formation of a stable γ' phase after a tempering treatment and which is to be added in an amount of at least 2.2 wt %. Added in excess of 3.0 wt %, however, it causes an increase in the γ' phase and lowers the hot formability. Accordingly, aluminum (Al) is situated in a range from 2.2 wt % to 3.0 wt %, preferably 2.5 wt % to 3.0 wt %.

Some of the titanium (Ti) is combined with carbon (C) to form a stable MC-type primary carbide and has a strength-enhancing function for alloys which are not γ'-hardened.

The remaining titanium (Ti) is present in the γ' phase in the solid solution state, thereby strengthening the γ' phase, and it serves to improve the high-temperature strength. Titanium (Ti) must therefore be added in an amount of at least 2.0 wt %, but the excessive addition thereof in excess of 3.0 wt % not only lowers the hot formability but also makes the γ' phase unstable and causes reductions in the strength after long-term use at high temperatures. Titanium (Ti) is therefore preferably also situated in the range from 2.2 wt % to 2.8 wt %.

Additionally, aluminum (Al), tantalum (Ta) and titanium (Ti) also have an important function of improving the oxidation resistance, and form stable oxide layer systems especially when the elements are combined.

In the same way as titanium (Ti), some of both niobium (Nb) and tantalum (Ta) is combined with carbon (C) to form stable MC-type primary carbides, and they have a strength-boosting function, especially for alloys which are not γ'-hardened.

The rest both of niobium (Nb) and of tantalum (Ta) is present in solution in the γ' phase, thereby strengthening the γ' phase solid solution, and it serves for improving the high-temperature strength.

Accordingly, niobium (Nb) and tantalum (Ta) may be added according to requirement. Since, however, the excessive addition thereof at more than 3.0 wt % reduces the hot formability, niobium (Nb) is situated in a range from 2.0 wt % or less to a minimum of 1.2 wt %.

Zirconium (Zr) and boron (B) are active for improving the high-temperature strength and ductility, through their grain boundary-active function, and at least one of them may be added to the alloy of the invention in an appropriate amount. Their effect is obtained at a low amount added.

Amounts of zirconium (Zr) and of boron (B) of more than 0.01 wt % or 0.012 wt % lower the solidus temperature on heating, to the detriment of the hot formability. Accordingly the upper limits for zirconium (Zr) and boron (B) are 0.01 wt % and 0.012 wt %, respectively.

Nickel (Ni) forms a stable austenitic phase and becomes a matrix both for the solid solution and for the precipitation of the γ' phase. Moreover, since nickel (Ni) is able to form a solid solution with a large amount of tungsten (W), an austenitic matrix is obtained which has a high strength at high temperatures, and nickel is therefore the balance of the alloy.

Apart from the elements described above, it is possible to add up to 20.0 wt % of cobalt (Co) to the alloy of the invention.

In the austenitic of the matrix, cobalt (Co) exists in the solid solution state, thereby achieving a certain solid solution strengthening, and it also has an effect in improving the close adhesion of the oxide film. Given that cobalt (Co) in the Ni matrix is in the solid solution state and that cobalt (Co) has virtually no adverse effect on the precipitation of the γ' phase, cobalt (Co) is favorable. However, since cobalt (Co) is an expensive element, the addition thereof in large amounts is not preferred.

The effect of these adaptations is to ensure processability for a productive L-PBF process with improved mechanical properties and increased oxidation resistance.

DETAILED DESCRIPTION OF INVENTION

In accordance with the invention, therefore, the nickel-based alloy comprises, more particularly consists of (in wt %):

carbon (C): 0.09%-0.13%,
more particularly 0.09%-0.11%,
chromium (Cr): 19.0%-21.5%,
more particularly 19.0%-21.0%,
cobalt (Co): 18.0%-20.0%,
more particularly 19.0%,
molybdenum (Mo): 0.5%-1.5%,
more particularly 0.8%-1.5%,
tungsten (W): 2.0%-3.0%,
more particularly 2.5%-3.0%,
titanium (Ti): 2.0%-3.0%,
more particularly 2.2%-2.8%,
aluminum (Al): 2.2%-3.0%,
more particularly 2.5%-3.0%,
boron (B): 0.008%-0.012%
zirconium (Zr): 0.0025%-0.01%
tantalum (Ta): 2.0%-4.0%,
more particularly 3.0%,
niobium (Nb): 1.2%-2.0%,
more particularly 1.5%-2.0%,
optionally
silicon (Si): up to 0.02%,
more particularly 0.01%-0.02%,
manganese (Mn): up to 0.01%
yttrium (Y): 0.0025%-0.01%
yttrium oxide ($Y_2O_3$): 0.75%-1.25%
vanadium (V): to 0.01%
hafnium (Hf): to 0.01%
silver (Ag): to 0.005%
lead (Pb): to 0.0003%
iron (Fe): to 0.02%
copper (Cu) to 0.01%
selenium (Se): to 0.0003%
oxygen (O): to 0.015%
phosphorus (P): to 0.005%
sulfur (S): to 0.001%
gallium (Ga): to 0.001%
bismuth (Bi): to 0.0001%
nitrogen (N): to 0.008%
magnesium (Mg): to 0.007%
tellurium (Te): to 0.00005%
thallium (Tl): to 0.0005%
calcium (Ca): to 0.0001%
potassium (K): to 0.0001%,
residual impurities to 0.1%.

The component is preferably a component of a turbine, more particularly of a gas turbine, and there more particularly in the "hot" region.

| | EX1 | EX2 | EX3 |
|---|---|---|---|
| C | 0.09 | 0.10 | 0.12 |
| Cr | 21.5 | 19.1 | 20.3 |
| Co | 18.2 | 19.8 | 18.9 |
| Mo | 0.5 | 1.5 | 0.8 |
| W | 2.5 | 3.0 | 2.0 |
| Ti | 3.0 | 2.8 | 3.0 |
| Al | 2.2 | 3.0 | 2.5 |
| B | 0.012 | 0.010 | 0.008 |
| Zr | 0.01 | 0.003 | 0.008 |
| Ta | 2.0 | 4.0 | 3.0 |
| Nb | 2.0 | 1.6 | 1.5 |
| Si | 0.02 | 0.01 | 0.02 |
| Y | 0.01 | 0.005 | — |
| $Y_2O_3$ | 0.75 | — | 1.23 |
| Fe | 0.02 | 0.01 | 0.01 |

The invention claimed is:

1. A nickel-based alloy, comprising (in wt %):

| | |
|---|---|
| carbon (C): | 0.09%-0.13% |
| chromium (Cr): | 19.0%-21.5% |
| cobalt (Co): | 18.0%-20.0% |

-continued

| | |
|---|---|
| molybdenum (Mo): | 0.5%-1.5% |
| tungsten (W): | 2.0%-3.0% |
| titanium (Ti): | 2.0%-3.0% |
| aluminum (Al): | 2.2%-3.0% |
| boron (B): | 0.008%-0.012% |
| zirconium (Zr): | 0.0025%-0.01% |
| tantalum (Ta): | 2.0%-4.0% |
| niobium (Nb): | 1.2%-2.0% |
| yttrium oxide (Y2O3): | 0.75%-1.25% |

balance nickel (Ni):
optionally:

| | |
|---|---|
| silicon (Si): | up to 0.02% |
| manganese (Mn) | up to 0.01% |
| yttrium (Y): | 0.0025%-0.01% |
| vanadium (V): | up to 0.01% |
| hafnium (Hf): | up to 0.01% |
| silver (Ag): | up to 0.005% |
| lead (Pb): | up to 0.0003% |
| iron (Fe): | up to 0.02% |
| copper (Cu): | up to 0.01% |
| selenium (Se): | up to 0.0003% |
| oxygen (O): | up to 0.015% |
| phosphorus (P): | up to 0.005% |
| sulfur (S): | up to 0.001% |
| gallium (Ga): | up to 0.001% |
| bismuth (Bi): | up to 0.0001% |
| nitrogen (N): | up to 0.008% |
| magnesium (Mg): | up to 0.007% |
| tellurium (Te): | up to 0.00005% |
| thallium (Tl): | up to 0.0005% |
| calcium (Ca): | up to 0.0001% |
| potassium (K): | up to 0.0001%, |
| residual impurities: | up to 0.1%. |

2. A powder comprising a nickel-based alloy which contains (in wt %):

| | |
|---|---|
| carbon (C): | 0.09%-0.13% |
| chromium (Cr): | 19.0%-21.5% |
| cobalt (Co): | 18.0%-20.0% |
| molybdenum (Mo): | 0.5%-1.5% |
| tungsten (W): | 2.0%-3.0% |
| titanium (Ti): | 2.0%-3.0% |
| aluminum (Al): | 2.2%-3.0% |
| boron (B): | 0.008%-0.012% |
| zirconium (Zr): | 0.0025%-0.01% |
| tantalum (Ta): | 2.0%-4.0% |
| niobium (Nb): | 1.2%-2.0% |
| yttrium oxide (Y2O3): | 0.75%-1.25% |

balance nickel (Ni):
optionally:

| | |
|---|---|
| silicon (Si): | up to 0.02% |
| manganese (Mn): | up to 0.01% |
| yttrium (Y): | 0.0025%-0.01% |
| vanadium (V): | up to 0.01% |
| hafnium (Hf): | up to 0.01% |
| silver (Ag): | up to 0.005% |
| lead (Pb): | up to 0.0003% |
| iron (Fe): | up to 0.02% |
| copper (Cu): | up to 0.01% |
| selenium (Se): | up to 0.0003% |
| oxygen (O): | up to 0.015% |
| phosphorus (P): | up to 0.005% |
| sulfur (S): | up to 0.001% |
| gallium (Ga): | up to 0.001% |
| bismuth (Bi): | up to 0.0001% |
| nitrogen (N): | up to 0.008% |
| magnesium (Mg): | up to 0.007% |

-continued

| | |
|---|---|
| tellurium (Te): | up to 0.00005% |
| thallium (Tl): | up to 0.0005% |
| calcium (Ca): | up to 0.0001% |
| potassium (K): | up to 0.0001%, |
| residual impurities: | up to 0.1%. |

3. An additive manufacturing process, comprising:

selectively melting powder in a layer-by-layer process to generate a geometric object;

wherein the powder comprises an alloy based on nickel which is composed of (in wt %):

| | |
|---|---|
| carbon (C): | 0.09%-0.13% |
| chromium (Cr): | 19.0%-21.5% |
| cobalt (Co): | 18.0%-20.0% |
| molybdenum (Mo): | 0.5%-1.5% |
| tungsten (W): | 2.0%-3.0% |
| titanium (Ti): | 2.0%-3.0% |
| aluminum (Al): | 2.2%-3.0% |
| boron (B): | 0.008%-0.012% |
| zirconium (Zr): | 0.0025%-0.01% |
| tantalum (Ta): | 2.0%-4.0% |
| niobium (Nb): | 1.2%-2.0% |
| yttrium oxide (Y2O3): | 0.75%-1.25% |

balance nickel (Ni):

optionally:

| | |
|---|---|
| silicon (Si): | up to 0.02% |
| manganese (Mn): | up to 0.01% |
| yttrium (Y): | 0.0025%-0.01% |
| vanadium (V): | up to 0.01% |
| hafnium (Hf): | up to 0.01% |
| silver (Ag): | up to 0.005% |
| lead (Pb): | up to 0.0003% |
| iron (Fe): | up to 0.02% |
| copper (Cu): | up to 0.01% |
| selenium (Se): | up to 0.0003% |
| oxygen (O): | up to 0.015% |
| phosphorus (P): | up to 0.005% |
| sulfur (S): | up to 0.001% |
| gallium (Ga): | up to 0.001% |
| bismuth (Bi): | up to 0.0001% |
| nitrogen (N): | up to 0.008% |
| magnesium (Mg): | up to 0.007% |
| tellurium (Te): | up to 0.00005% |
| thallium (Tl): | up to 0.0005% |
| calcium (Ca): | up to 0.0001% |
| potassium (K): | up to 0.0001%, |
| residual impurities: | up to 0.1%. |

4. A component comprising a substrate, comprising a nickel-based alloy which is composed of (in wt %):

| | |
|---|---|
| carbon (C): | 0.09%-0.13% |
| chromium (Cr): | 19.0%-21.5% |
| cobalt (Co): | 18.0%-20.0% |
| molybdenum (Mo): | 0.5%-1.5% |
| tungsten (W): | 2.0%-3.0%, |
| titanium (Ti): | 2.0%-3.0% |
| aluminum (Al): | 2.2%-3.0% |
| boron (B): | 0.008%-0.012% |
| zirconium (Zr): | 0.0025%-0.01% |
| tantalum (Ta): | 2.0%-4.0% |
| niobium (Nb): | 1.2%-2.0% |
| yttrium oxide (Y2O3): | 0.75%-1.25% |

balance nickel (Ni):
optionally:

| | |
|---|---|
| silicon (Si): | up to 0.02% |
| manganese (Mn): | up to 0.01% |
| yttrium (Y): | 0.0025%-0.01% |
| vanadium (V): | up to 0.01% |
| hafnium (Hf): | up to 0.01% |
| silver (Ag): | up to 0.005% |
| lead (Pb): | up to 0.0003% |
| iron (Fe): | up to 0.02% |
| copper (Cu): | up to 0.01% |
| selenium (Se): | up to 0.0003% |
| oxygen (O): | up to 0.015% |
| phosphorus (P): | up to 0.005% |
| sulfur (S): | up to 0.001% |
| gallium (Ga): | up to 0.001% |
| bismuth (Bi): | up to 0.0001% |
| nitrogen (N): | up to 0.008% |
| magnesium (Mg): | up to 0.007% |
| tellurium (Te): | up to 0.00005% |
| thallium (Tl): | up to 0.0005% |
| calcium (Ca): | up to 0.0001% |
| potassium (K): | up to 0.0001%, |
| residual impurities: | up to 0.1%. |

5. The nickel-based alloy of claim 1, comprising (in wt %):

yttrium (Y): 0.0025%-0.01%.

6. The nickel-based alloy of claim 1, comprising (in wt %):

manganese (Mn): >0 up to 0.01%.

7. The nickel-based alloy of claim 1, comprising (in wt %):

iron (Fe): >0 up to 0.02%.

8. The nickel-based alloy of claim 1, comprising (in wt %):

Chromium (Cr): 19.0%-21.0%.

9. The nickel-based alloy of claim 1, comprising (in wt %):

molybdenum (Mo): 0.8%-1.5%.

10. The nickel-based alloy of claim 1, comprising (in wt %):

tungsten (W): 2.5%-3.0%.

11. The nickel-based alloy of claim 1, comprising (in wt %):

titanium (Ti): 2.2%-2.8%.

12. The nickel-based alloy of claim 1, comprising (in wt %):

aluminum (Al): 2.5%-3.0%.

13. The nickel-based alloy of claim 1, comprising (in wt %):

niobium (Nb): 1.5%-2.0%.

14. The nickel-based alloy of claim 1, comprising (in wt %):

silicon (Si): 0.01%-0.02%.

* * * * *